US008539374B2

(12) United States Patent
Okaro et al.

(10) Patent No.: US 8,539,374 B2
(45) Date of Patent: Sep. 17, 2013

(54) GRAPHICAL USER INTERFACE FOR ELECTRONIC DEVICES

(75) Inventors: Oke Okaro, Jersey City, NJ (US); Jeremy A. Weinrib, New York, NY (US)

(73) Assignee: Disney Enterprises, Inc., Burbank, CA (US)

(*) Notice: Subject to any disclaimer, the term of this patent is extended or adjusted under 35 U.S.C. 154(b) by 913 days.

(21) Appl. No.: 11/232,965

(22) Filed: Sep. 23, 2005

(65) Prior Publication Data

US 2006/0253801 A1   Nov. 9, 2006

(51) Int. Cl.
*G06F 3/048* (2006.01)
*G06F 3/00* (2006.01)

(52) U.S. Cl.
USPC .......................................... 715/810; 715/856

(58) Field of Classification Search
USPC ................. 715/864, 810, 828, 829, 830, 831, 715/845, 856, 857, 702
See application file for complete search history.

(56) References Cited

U.S. PATENT DOCUMENTS

| | | | |
|---|---|---|---|
| 5,805,167 A | | 9/1998 | Van Cruyningen |
| 5,914,716 A | * | 6/1999 | Rubin et al. .................. 715/779 |
| 6,272,332 B1 | | 8/2001 | Matsumoto et al. |
| 6,466,275 B1 | | 10/2002 | Honey et al. |
| 6,489,968 B1 | | 12/2002 | Ortega et al. |
| 6,510,515 B1 | | 1/2003 | Raith |
| 6,536,041 B1 | | 3/2003 | Knudson et al. |
| 6,920,211 B2 | | 7/2005 | Pelletier et al. |
| 2001/0028368 A1 | * | 10/2001 | Swartz et al. ................. 345/835 |
| 2001/0032254 A1 | | 10/2001 | Hawkins |
| 2002/0010775 A1 | * | 1/2002 | Rakavy et al. ................. 709/224 |
| 2002/0078467 A1 | | 6/2002 | Rosin et al. |
| 2003/0008686 A1 | * | 1/2003 | Park et al. ..................... 455/566 |
| 2003/0040340 A1 | * | 2/2003 | Smethers ...................... 455/566 |
| 2003/0055753 A1 | | 3/2003 | Dellar et al. |

(Continued)

FOREIGN PATENT DOCUMENTS

| | | |
|---|---|---|
| CN | 1604025 A | 4/2005 |
| EP | 0 947 921 A2 | 10/1999 |

(Continued)

OTHER PUBLICATIONS

Personal Communications Services Limited Guide to Using Your SPV C500, Jun. 2004 (pp. 1-195).

(Continued)

*Primary Examiner* — Rashawn Tillery
(74) *Attorney, Agent, or Firm* — Ference & Associates LLC

(57) ABSTRACT

An electronic device is provided. The electronic device includes a display and a processor configured to control the display of a graphical user interface on the display. The electronic device further includes a computer readable medium containing instructions for configuring the processor to provide a menu. The menu includes a plurality of links. The links include at least one link that corresponds to a submenu. The submenu includes a further plurality of links. The processor monitors a plurality of user inputs and monitors the position of a cursor within the display. The processor displays the menu upon entry of a first user input, and displays the submenu upon selection of the corresponding submenu link within the menu. When the cursor is within a content portion of the display and the menu is not displayed, the processor displays the submenu upon entry of a second user input, without first displaying the menu.

41 Claims, 12 Drawing Sheets

(56) References Cited

U.S. PATENT DOCUMENTS

| | | | |
|---|---|---|---|
| 2003/0090471 A1* | 5/2003 | Slaunwhite et al. | 345/172 |
| 2003/0204275 A1 | 10/2003 | Krubeck | |
| 2004/0001105 A1* | 1/2004 | Chew et al. | 345/817 |
| 2004/0001706 A1* | 1/2004 | Jung et al. | 386/125 |
| 2004/0036679 A1* | 2/2004 | Emerson | 345/168 |
| 2004/0067768 A1 | 4/2004 | King et al. | |
| 2004/0075693 A1* | 4/2004 | Moyer et al. | 345/810 |
| 2004/0103433 A1 | 5/2004 | Regeard et al. | |
| 2004/0130578 A1 | 7/2004 | Charney | |
| 2004/0155909 A1* | 8/2004 | Wagner | 345/854 |
| 2004/0185834 A1 | 9/2004 | Sommers et al. | |
| 2004/0192306 A1 | 9/2004 | Elkarat et al. | |
| 2004/0201624 A1 | 10/2004 | Crawford | |
| 2004/0250217 A1* | 12/2004 | Tojo et al. | 715/810 |
| 2005/0054381 A1 | 3/2005 | Lee et al. | |
| 2005/0076309 A1* | 4/2005 | Goldsmith | 715/811 |
| 2005/0091222 A1 | 4/2005 | Serlet et al. | |
| 2005/0144200 A1 | 6/2005 | Hesselink et al. | |
| 2005/0176454 A1 | 8/2005 | Chakraborty et al. | |
| 2005/0188312 A1 | 8/2005 | Bocking et al. | |
| 2005/0190159 A1 | 9/2005 | Skarine | |
| 2005/0190616 A1 | 9/2005 | Widergren et al. | |
| 2005/0198308 A1 | 9/2005 | Hoyland et al. | |
| 2005/0235226 A1* | 10/2005 | Watanabe et al. | 715/835 |
| 2006/0022899 A1* | 2/2006 | Johnson | 345/55 |
| 2006/0095848 A1* | 5/2006 | Naik | 715/716 |
| 2006/0101350 A1* | 5/2006 | Scott | 715/779 |
| 2006/0123360 A1* | 6/2006 | Anwar et al. | 715/810 |
| 2007/0050732 A1* | 3/2007 | Chapman et al. | 715/810 |
| 2007/0200875 A1* | 8/2007 | Seeger | 345/902 |

FOREIGN PATENT DOCUMENTS

| | | |
|---|---|---|
| EP | 1 396 985 A2 | 3/2004 |
| EP | 1 521 168 A2 | 4/2005 |
| JP | H02-502948 | 9/1990 |
| JP | 2000-231429 | 8/2000 |
| JP | 2001-216060 | 8/2001 |
| JP | 2005-165491 | 6/2005 |
| WO | 9001190 | 2/1990 |

OTHER PUBLICATIONS

*Oracle White Paper*, "Oracle Application Server Wireless: Messaging Services," Aug. 2003 (16 pages).

*Oracle White Paper*, "Oracle Application Server $10^g$ Wireless: Mobile Messaging Services," Jun. 2004 (18 pages).

International Search Report, International Application No. PCT/US2006/036519, dated Sep. 26, 2007.

International Search Report, International Application No. PCT/US2006/036519, dated Oct. 1, 2008, 6 pages.

International Preliminary Report on Patentability, International Application No. PCT/US2006/036519, dated Oct. 8, 2008, 12 pages.

* cited by examiner

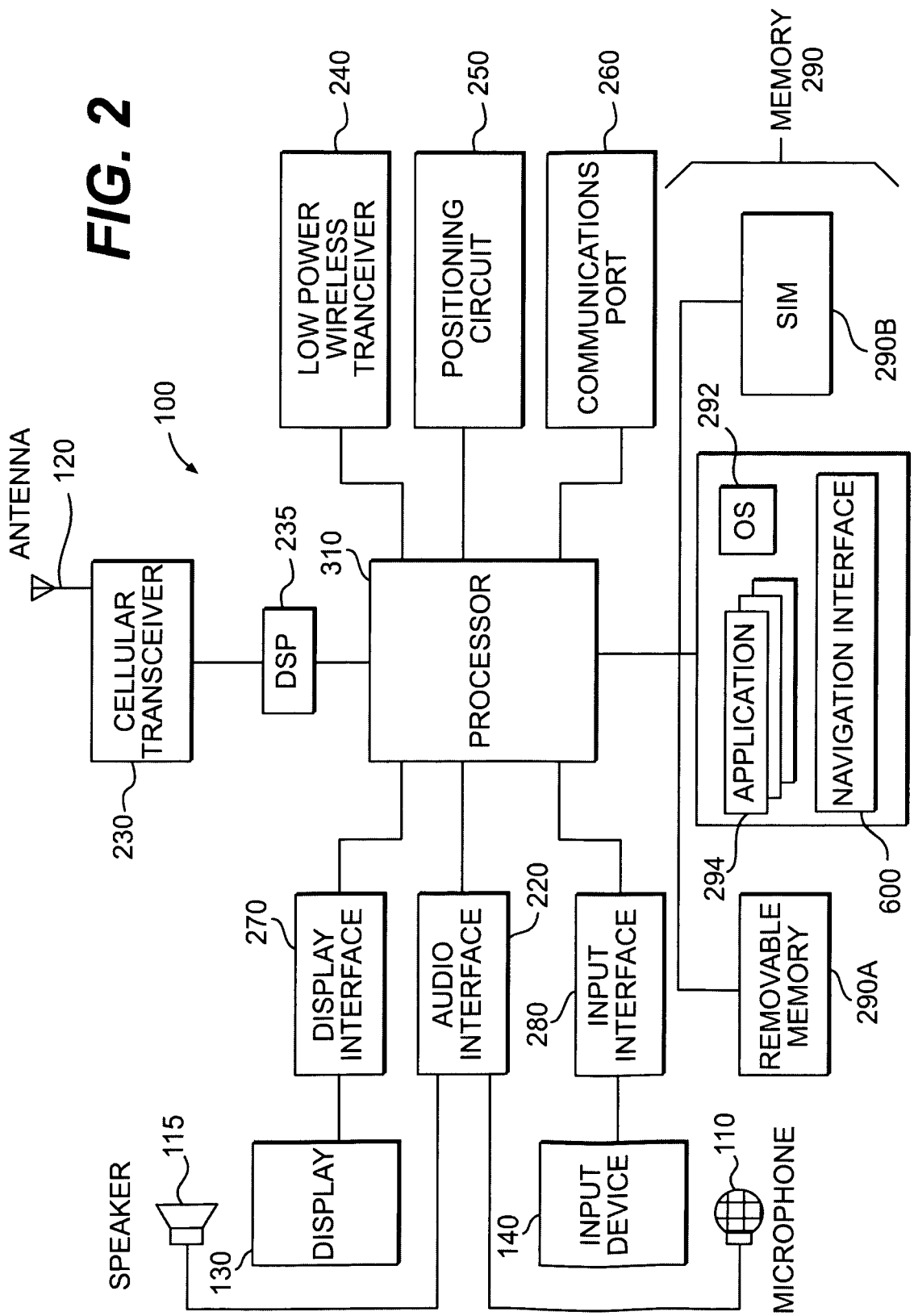

GRAPHICAL USER INTERFACE FOR ELECTRONIC DEVICES

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure is related to systems and methods for providing a graphical user interface for electronic devices and, in particular, for providing a graphical user interface for small-screen electronic displays.

BACKGROUND

As mobile electronic devices, such as cellular telephones, personal digital assistants (PDAs) and pagers, have become more sophisticated, the range of applications that they may offer has become more extensive. Such devices are now often provided with full color, high resolution liquid crystal displays (LCDs) that enable users to view sophisticated graphics, pictures, and video content. Further, new network access protocols, such as the Evolution Data Optimized (EVDO), Wireless Application Protocol (WAP), and i-Mode protocols, allow users to access Internet content through digital cellular networks. Such advances have considerably increased the volume and variety of content available to users of mobile devices: today, such devices can access much of the same content that was once available only through use of a personal computer connected to the Internet via a land line. Because mobile devices are easily transportable, and thus accessible by a user in any situation, users could benefit by having access to such a wealth of content on their mobile devices.

However, while consumers now have the technical ability to access the same types of content on their mobile devices as on their personal computers, they have yet to embrace such mobile applications. One of the main issues inhibiting the mass adoption of mobile applications today is the lack of a user interface that would allow users to easily and intuitively navigate the depth and breadth of content that has become available.

The traditional solution to navigation of complex applications is to create a hierarchical menu structure that is presented to the user. The user is then required to linearly descend several layers of the hierarchy to find the content they are looking for and, once located, the user is taken out of the menu and into the content. Navigating elsewhere within the application requires the user to exit and re-enter the top of the menu hierarchy, and then descend to the correct content. With such an approach, the content is not organized by relevance, and the user loses the frame of reference as the user is taken out of the menu structure to view the selected content.

While this solution may be adequate for personal computer systems, mobile devices present challenges that necessitate a unique approach to user interface design. For example, most mobile devices are provided with only a limited-function keyboard designed to be operated with one hand, and lack the full-sized keyboard and mouse used to navigate the complex menu structures typical of personal computer applications. Moreover, the displays for mobile devices, while as technically sophisticated as those for personal computers, are typically much smaller (usually less than five inches) than personal computer displays (usually greater than fifteen inches). Consequently, the navigation tools provided for mobile devices must be presented on a smaller scale, so that the user more easily loses their frame of reference while navigating between the menu and content.

Thus, the traditional approach to navigation is significantly deficient when applied to mobile devices, and conventional mobile device interfaces are not adapted to navigate the depth and breadth of content that could be provided through such devices. Because of the lack of an easy to use and intuitive interface for accessing broad content, content providers are unable to adequately serve the needs of mobile device users. Accordingly, there is a need for improved graphical user interfaces for enabling the display and navigation of greater amounts of content on electronic devices, without regard to the size of the display screen or the type of user input devices present on the device.

SUMMARY

Consistent with the present disclosure, a computer-readable medium containing instructions for configuring a processor to perform a method for providing a graphical user interface on a display is provided. The method includes: providing a menu, the menu comprising a plurality of links, wherein the links include at least one link that corresponds to a submenu, the submenu comprising a further plurality of links; monitoring a plurality of user inputs; monitoring the position of a cursor within the display; displaying the menu upon entry of a first user input; displaying the submenu upon selection of the corresponding submenu link within the menu; and when the cursor is within a content portion of the display and the menu is not displayed, displaying the submenu upon entry of a second user input, without first displaying the menu.

Consistent with the present disclosure, a system is also provided. The system includes a processor configured to control the display of a graphical user interface on a display. The system further includes a computer readable medium containing instructions for configuring the processor to provide a menu. The menu includes a plurality of links. The links include at least one link that corresponds to a submenu. The submenu includes a further plurality of links. The processor monitors a plurality of user inputs and monitors the position of a cursor within the display. The processor displays the menu upon entry of a first user input, and displays the submenu upon selection of the corresponding submenu link within the menu. When the cursor is within a content portion of the display and the menu is not displayed, the processor displays the submenu upon entry of a second user input, without first displaying the menu.

Consistent with the present disclosure, an electronic device is provided. The electronic device includes a display and a processor configured to control the display of a graphical user interface on the display. The electronic device further includes a computer readable medium containing instructions for configuring the processor to provide a menu. The menu includes a plurality of links. The links include at least one link that corresponds to a submenu. The submenu includes a further plurality of links. The processor monitors a plurality of user inputs and monitors the position of a cursor within the display. The processor displays the menu upon entry of a first user input, and displays the submenu upon selection of the corresponding submenu link within the menu. When the cursor is within a content portion of the display and the menu is not displayed, the processor displays the submenu upon entry of a second user input, without first displaying the menu.

Consistent with the present disclosure, a method for providing a graphical user interface on an electronic display is provided. The method includes: providing a menu, the menu comprising a plurality of links, wherein the links include at least one link that corresponds to a submenu, the submenu comprising a further plurality of links; monitoring a plurality of user inputs; monitoring the position of a cursor within the display; displaying the menu upon entry of a first user input; displaying the submenu upon selection of the corresponding submenu link within the menu; and when the cursor is within a content portion of the display and the menu is not displayed, displaying the submenu upon entry of a second user input, without first displaying the menu.

Additional objects and advantages of the present disclosure will be set forth in part in the description which follows, and in part will be obvious from the description, or may be learned by practice of the embodiments. The objects and advantages of the present disclosure will be realized and attained by means of the elements and combinations particularly pointed out in the appended claims. It is to be understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate several embodiments consistent with the present description and together with the description, serve to explain the principles of the invention.

FIG. 2 is a functional block diagram of the exemplary electronic device of FIG. 1.

DESCRIPTION OF THE EMBODIMENTS

Reference will now be made in detail to exemplary embodiments of the present disclosure, examples of which are illustrated in the accompanying drawings. Wherever possible, the same reference numbers will be used throughout the drawings to refer to the same or like parts.

Figure 1A:
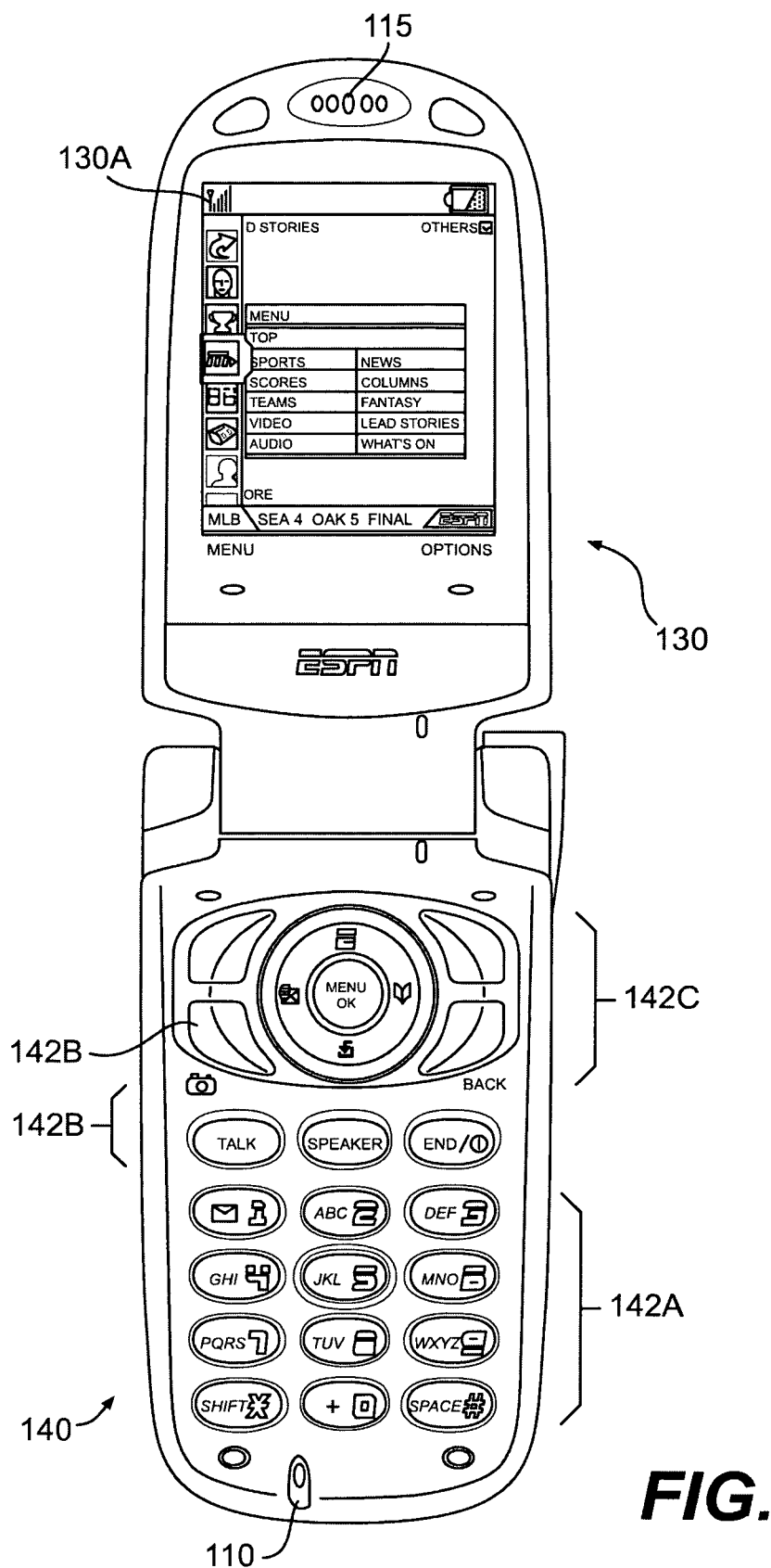
FIGS. 1A-C show external features of an exemplary electronic device, consistent with the present disclosure.
Figure 1B:
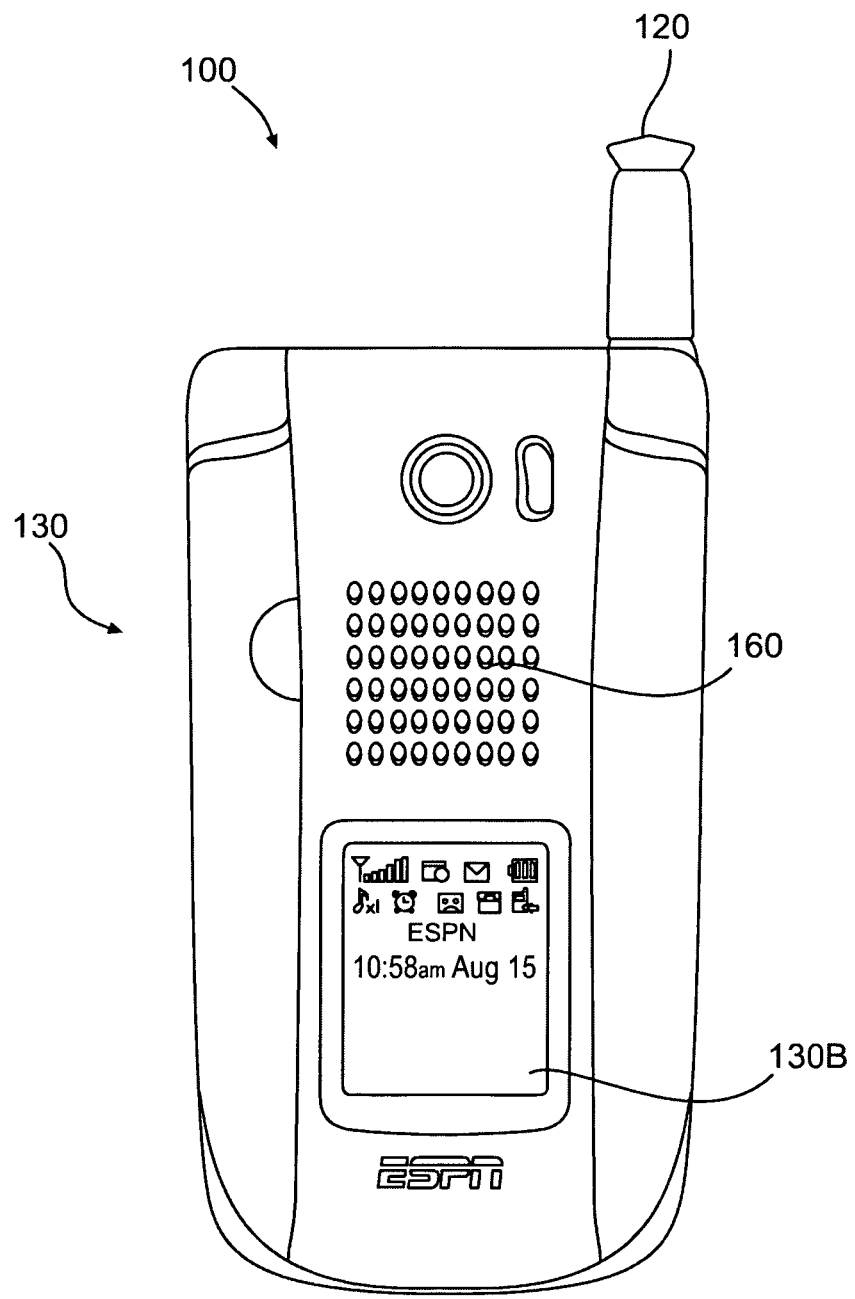

FIG. 1 shows external features of an exemplary electronic device 100 consistent with the present disclosure. As shown in FIG. 1, exemplary electronic device 100 may be configured as a foldable, or "clam shell" style, web-enabled mobile telephone (such as the model MM-8300 Multimedia Phone available from Sanyo North America Corporation) having an open position (FIG. 1A) and a closed position (FIG. 1B). However, it should be noted that systems and methods consistent with the present disclosure may be used with electronic devices configured using different hardware without departing from the scope of the present invention.

For example, systems and methods of the present disclosure may be applied to other mobile electronic devices, such as PDAs, pagers, etc., and to other handheld electronic devices, such as, e.g., the iPod digital music player (available from Apple Computer, Inc.). Other suitable hardware platforms will be apparent to those skilled in the art. For instance, electronic device 100 may alternatively be configured as a laboratory instrument, television set, or set-top box (such as the TiVo digital video recorder, available from TiVo Inc.). Finally, although systems and methods consistent with the present disclosure may be particularly well suited for use with electronic devices having small-screen displays, such systems and methods may also be applied to devices having relatively large screens, such as personal computer and television displays.

As shown in FIG. 1A, exemplary electronic device 100 may include a microphone 110 and a speaker 115 (for cellular telephone communications via an antenna 120), a display 130, and an input device 140. As shown FIG. 1B, device 100 may also include a camera 150 for capturing still or video images and a speakerphone 160 for hands-free communication.

Display 130 may be any type of graphical display suitable for displaying a graphical user interface consistent with the present disclosure. Display 130 may include a plurality of displays, such as a main display 130A, active when device 100 is in the open position (FIG. 1A), and, in some embodiments, a smaller sub-display 130B, active when device 100 is in the closed position (FIG. 1B). Both main display 130A and sub-display 130B may be implemented using full-color (e.g., 260,000 colors) active matrix LCD displays. However, one skilled in the art will understand that other types of displays (e.g., monochrome displays) may be used.

In exemplary embodiments of the present disclosure, the display may be less than five inches in its largest dimension. In particular, as in exemplary electronic device 100, both displays 130A and B may be less than three inches in their largest dimension. For example, main display 130A may be a 2.1" thin film transistor (TFT) QVGA (240×320 pixels) display, and sub-display 130B may be a 1.1" TFT display. In some embodiments, display 130 may include a touch screen display capable of both outputting visual information to the user and receiving manual input from the user. For example, main display 130A of exemplary device 100 may be implemented using such a touch screen display.

Input device 140 may be implemented using one or more user input devices adapted for data or command entry. As shown in FIG. 1A, input device 140 may include a keypad 142 adapted for one-handed use. Keypad 142 may include a 3×4 button alpha-numeric telephone keypad 142A. Alternatively, keypad 142 may include a full-sized keyboard (such as a "QWERTY" keyboard, not shown). Keypad 142 may also include a plurality of telephone function inputs 142B. As illustrated in FIG. 1A, for example, keypad 142 may include a TALK (or SEND) key, for initiating telephone communications, a SPEAKER key for actuating speakerphone 160, an END key for ending telephone communications and other applications, as well as a key for actuating camera 150 (denoted in FIG. 1A by a camera icon).

Figure 1C:
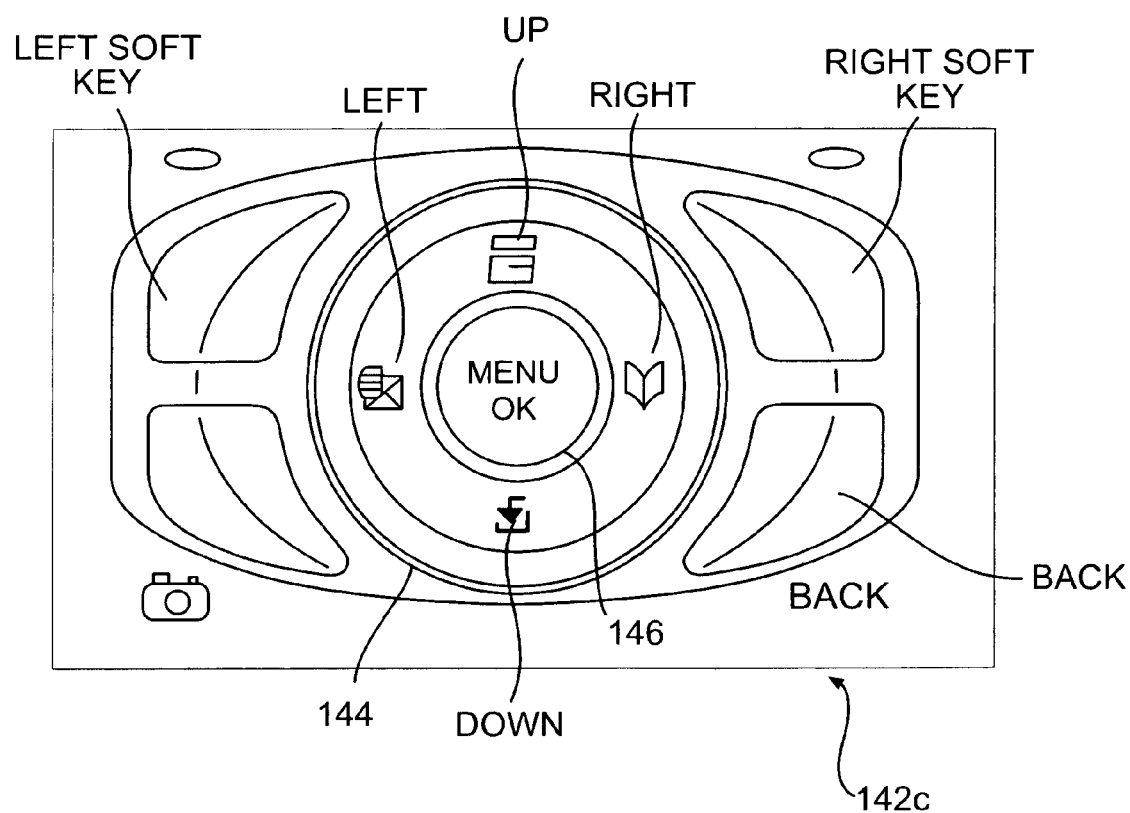

In an exemplary embodiment of the present disclosure, keypad 142 may also include a plurality of navigation inputs 142C. As shown in FIG. 1C, navigation inputs 142C may include a directional input 144, for positioning the cursor within main display 130A, and a SELECT input 146. Directional input 144 may include a four-way rocker switch having UP, DOWN, LEFT, and RIGHT directional keys. However, it is to be understood that directional input 144 may be implemented by any suitable technology. For example, directional input 144 may be implemented by discrete buttons, a joystick, touchpad, trackball, or other manual input suitable for cursor navigation, such as the Jog Dial™ actuator available from Sony Corporation. Alternatively, display 130A may be configured as a touch screen display, and cursor navigation accomplished by the user touching the surface of the display, e.g., with a finger or stylus. In some embodiments, electronic device 100 may include software to allow cursor navigation by voice command, e.g., via microphone 110.

Further as shown in FIG. 1C, navigation keys 142C may include a LEFT SOFTKEY, a RIGHT SOFTKEY, and a BACK key. The functions of LEFT SOFTKEY and RIGHT SOFTKEY may vary depending upon the users location within the application, and their functions at any given point in the application may be dynamically indicated on the display, e.g., by softkey labels 132 at the bottom of main display 130A. As shown in FIG. 1A, for example, LEFT SOFTKEY is labeled "Menu" and RIGHT SOFTKEY is labeled "Options."

Navigation keys 142C may perform different functions in different applications, and may perform different functions at different points within a single application. The functions of navigation keys 142C within the exemplary graphical user interface is described below in relation to FIGS. 5-6.

FIG. 2 is a functional block diagram of an electronic device consistent with the present disclosure, specifically, exemplary electronic device 100 of FIG. 1. As shown in FIG. 2, exemplary electronic device 100 may include a processor 210, an audio interface 220, a cellular transceiver 230, a digital signal processor (DSP) 235, a low-power wireless transceiver 240, a positioning circuit 250, a communications port 260, a display interface 270, an input interface 280, and a memory 290 (collectively referred to as functional components). However, it will be understood by those skilled in the art that exemplary electronic device 100 could be implemented in other functional configurations, and may include other functional components known to those skilled in the art, without departing from the scope of the present disclosure.

Processor 210 may be implemented using a microprocessor or other controller that may be selectively activated or configured by a computer program to perform one or more methods consistent with the present disclosure. As shown in FIG. 2, processor 210 may be operatively coupled to control functional components 220-280, according to such methods, as described below.

Audio interface 220 may include appropriate drivers for driving microphone 110, speaker 115, and/or speakerphone 160 for use in voice communications. In some embodiments, processor 210 may include an application to enable voice-activated communication, e.g., voice recognition of commands, through audio interface 220.

Cellular transceiver 230 may be operatively coupled to antenna 120 for transmitting and receiving RF communication signals. For example, cellular transceiver 230 may be implemented using a CDMA, TDMA, and/or GSM compatible transceiver operable to transmit and receive digital and/or analog cellular telephony and/or data signals.

DSP 235 may be operatively coupled to enable communication of digital signals between processor 210 and transceiver 230. DSP 235 may decode or otherwise process digital communication signals received through cellular transceiver 230, as well as encode signals to be transmitted by transceiver 230. For example, DSP may digitally encode an analog voice signal received from audio interface 220.

Low-power wireless transceiver 240 may be operable to enable communications with low-power wireless devices. For example, low-power transceiver 240 may be configured to allow device 100 to communicate with, e.g., headsets, keyboards, printers, etc., e.g., using the Bluetooth™, IEEE 802.11, infrared, or other low-power wireless communications protocol.

Positioning circuit 250 may be operable to provide information related to the geographic location of electronic device 100. For example, positioning circuit 250 may receive a plurality of signals provided by, e.g., the Global Positioning System (GPS) or wireless base stations 214, and calculate the position of device 100 based on triangulation of the signals.

Communications port 260 may provide a wired communication link between processor 210 and another electronic device, such as a personal computer. Communication port 260 may be implemented using any suitable wired communication protocol, such as USB, RS-232, or other standard.

Display interface 270 may include appropriate drivers for driving display 130 to output graphics and/or video displays in accordance with control signals provided by processor 110. Input interface 280 may include an appropriate encoder for encoding input received from input device 140 (e.g., keypad 142) in a form suitable for interpretation by processor 210.

Memory 290 may be implemented using a suitable computer-readable media operatively connected to processor 210. Consistent with the present disclosure, a computer readable medium may be any type of memory, such as read-only memory (ROM), random-access memory (RAM), etc., that is capable of carrying information that may be used to processor 110 to perform methods consistent with the present disclosure. For example, computer readable media may be implemented using computer readable storage media such as memory, physical media (e.g., a punch card), magnetic media (e.g., a magnetic disk or tape), optical media (e.g., an optical disk), etc., or using computer readable transmission media such as a carrier wave (e.g., from a computer network, such as a wireless network or the Internet), etc.

As shown in FIG. 2, memory 290 may include a removable memory component 290A and a Subscriber Identity Module (SIM) 290B. Removable memory 290B may include a compact flash memory stick or card (e.g., a miniSD removable memory card), e.g., for storing still picture and/or video taken using camera 150. SIM 290B may be used to identify electronic device 100 to a wireless services provider, and so allow the user to access their subscribed services via electronic device 100. In order to identify the subscriber, SIM 290B may contain an identifier, such as an International Mobile Subscriber Identity (IMSI) number, that is unique to each subscriber.

Consistent with the present disclosure, memory 290 may also include a system memory 290C for storing software and/or data for configuring processor 210 to perform methods consistent with the present disclosure. As shown in FIG. 2, system memory 280C may store an operating system (OS) 292 and one or more software applications 294. Operating system 292 may control the basic operation of functional components 210-290, as well as the initiation and operation of applications 294. For example, operating system 292 may be implemented using the SmartPhone or Symbian operating systems (available from Microsoft Corporation and Symbian PLC, respectively), or some other operating system suitable for the particular configuration of electronic device 100.

Software applications 294 may include one or more programs, which control the operation of functional components 210-390. For example, applications 294 may include applications for sending and/or receiving data, e.g., according to the short messaging service (SMS), enhanced messaging service (EMS), or multimedia messaging service (MMS) protocols, and may also include applications for sending and/or receiving data and/or applications according to, e.g., the EVDO, WAP, or i-Mode mobile device protocols for accessing the Internet.

In particular, applications 294 may include a navigation interface 600 for performing one or more methods consistent with the present disclosure. An exemplary navigation interface 600 is described below with respect to FIG. 6.

Figure 3:
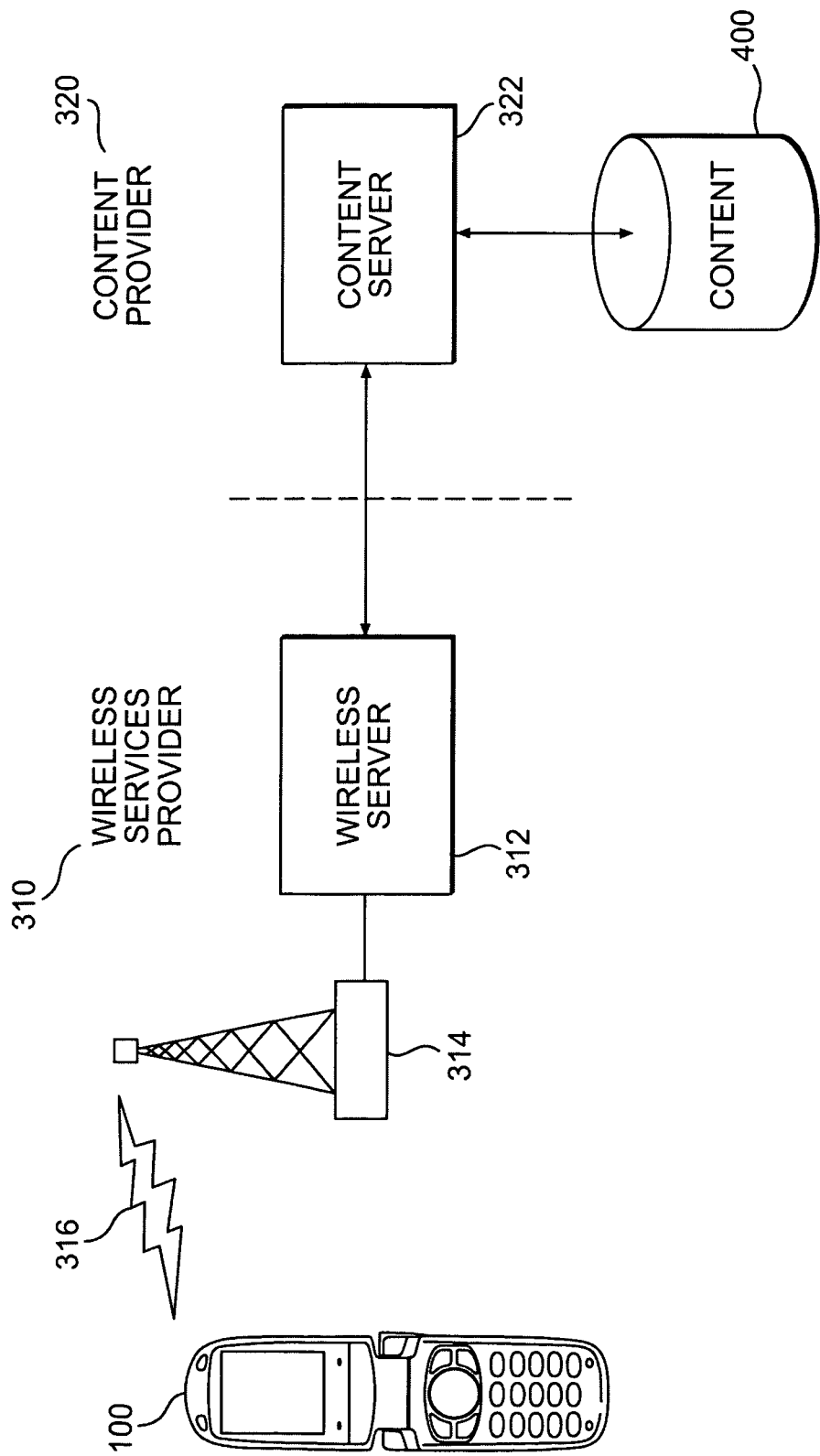
FIG. 3 shows a functional block diagram of an exemplary mobile communications network, consistent with the present disclosure.

In an exemplary embodiment of the invention, navigation interface 600 may be configured to navigate content accessible to electronic device 100 via a mobile communications network. FIG. 3 shows a functional block diagram of an exemplary mobile communications network 300 consistent with the present disclosure. As shown in FIG. 3, mobile communications network 300 may include a wireless service provider 310 and a content provider 320.

Wireless service provider 310 may provide cellular telephony or other digital communications services to users of mobile electronic devices, such as exemplary device 100. Wireless provider 310 may be a cellular telephone service provider (such as Sprint Nextel Corporation), a personal communications services (PCS) service provider, or a provider of other wireless services. Wireless provider 310 may operate a wireless server 312 and a network of base stations 314. As shown in FIG. 3, exemplary device 100 may communicate with wireless server 312 using a "client-server" software architecture over a wireless link 316 through base stations 314.

Content provider 320 may be an internet service provider (ISP) or other provider of digital content. Content provider 320 may operate a content server 322 for providing access to digital content 400 stored in computer readable media. Service provider 310 may be linked to content provider 320 through any appropriate communications link 324, such as a WAP gateway, a socket connection, etc.

In an exemplary embodiment of the present disclosure, wireless service provider 310 may retrieve digital content from content server 322 over communications link 324 and provide such content to exemplary device 100 over wireless link 316. However, it is to be understood that the present disclosure is not limited to such an arrangement, and that device 100 may obtain content 400 by other mechanisms. For example, device 100 may be linked to content provider 320 by a land line and, in some embodiments, some or all of content 400 may be stored in a memory (e.g., system memory 290C) of electronic device 100.

The content 400 provided by content provider 320 may be any type of content, such as news, weather, stock quotes, local content, etc., suitable for access using a mobile electronic device, such as exemplary device 100. In an exemplary embodiment of the present disclosure, the content may be sports-related content provided by Mobile ESPN™.

Figure 4:
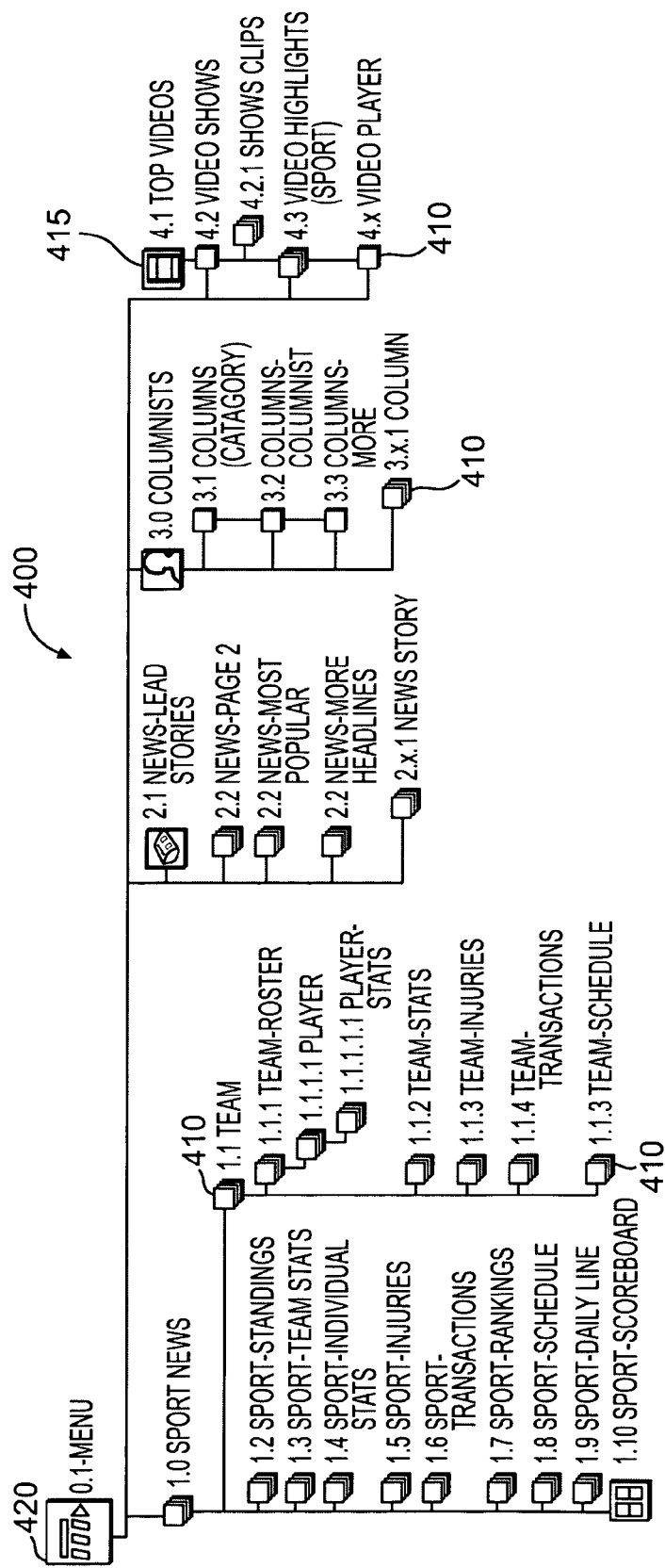
FIG. 4 shows a topical map of exemplary content of an application, consistent with the present disclosure.

FIG. 4 shows a topical map 405 of exemplary content 400 of an application consistent with the present disclosure. Each small block in map 405 represents a content page 410. Frequently used content pages may be denoted by icons 415. Large block 420 represents a top menu application. The content of each page 410 in the exemplary map 405 is described by its title. In exemplary application map 405, the content corresponds to sports-related content provided by Mobile ESPN™, such as RealTime scores, sports-related news, commentary, video and statistics, software applications, e.g., for managing fantasy sports teams, and other sports-related content. However, the content exemplified by the map of FIG. 4 is used here for purposes of illustration only, and it is to be understood that systems and methods of the present disclosure are not limited to any particular type or category of content.

Figure 5:
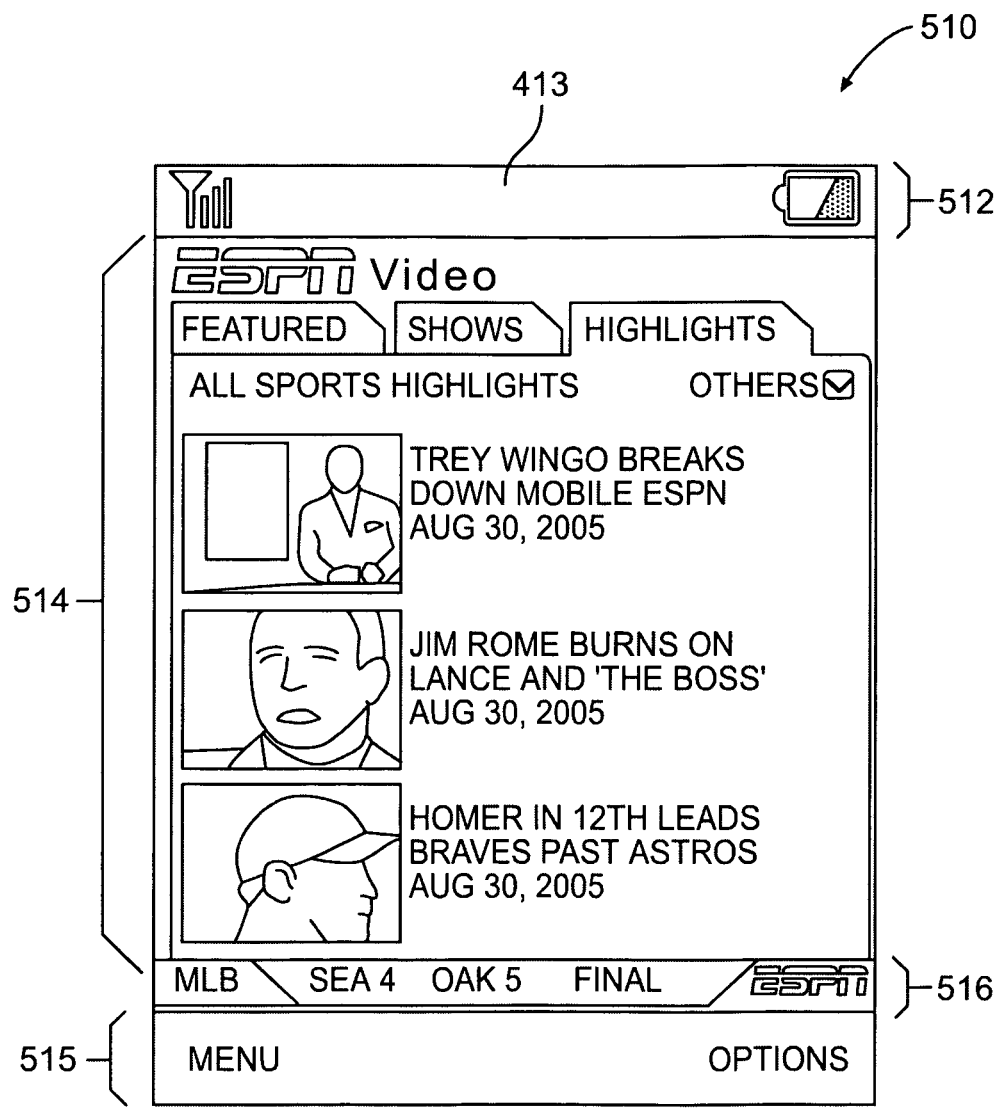
FIG. 5 shows an exemplary screen display of a graphical user interface, consistent with the present disclosure.

Content pages 410 may include text, links, graphics, pictures, and/or video content. FIG. 5 shows an exemplary content page 4.3 ("Video Highlights (Sport)") of exemplary application map 405 as it may be displayed in an exemplary screen display 510. Exemplary screen display 510 may be displayed, e.g., on main display 130A of exemplary device 100.

As shown in FIG. 5, screen display 510 may include a status portion 512, a content portion 514, a message portion 516, and a softkey portion 516. Status portion 512 may be used to indicate the status of components or applications of device 100. For example, status portion 512 may display icons and/or text indicative of current cellular signal strength and/or battery power, a message waiting indicator, etc. Content portion 514 may be used to display application content pages 410, such as content page 4.3 (as shown). Message portion 516 may be used to display short text messages, such as, e.g., a scrolling stock ticker or (as illustrated in FIG. 5) rotating sports scores. Softkey portion 516 may be used to indicate the current function of LEFT SOFTKEY and RIGHT SOFTKEY within navigation interface 600. As shown in FIG. 5, for example, the function of LEFT SOFTKEY is labeled as "Menu," and the function of RIGHT SOFTKEY is labeled as "Options."

In an exemplary embodiment of the present disclosure, the positions and dimensions of screen portions 512-518 may be persistent throughout navigation interface 600. That is, the status, message, softkey and content portions 512-518 may maintain their positions and dimensions on display 130A, regardless of where the user is located within the application.

FIG. 6 shows a plurality of screen displays of an exemplary navigation interface 600 for navigating content 400 of FIG. 4. The operation of exemplary navigation interface 600 will now be described with reference to FIG. 6.

In some embodiments of the present disclosure, navigation interface 600 may be configured to be selectively invoked by the user. In such an embodiment, OS 292 may invoke navigation interface 600 upon entry of an appropriate command by the user. In an exemplary embodiment of the present disclosure, for example, navigation interface 600 may be selectively invoked by entering an UP directional input from an idle screen of OS 292. In an alternative embodiment, navigation interface 600 may be invoked automatically by OS 292 on startup of device 100. For example, OS 292 may be configured to invoke navigation interface 600 as the default graphical user interface for electronic device 100.

Upon invocation, navigation interface 600 may obtain frequently used data or content from content provider 320. For example, navigation interface 600 may establish a wireless link 316 with wireless server 312 in order to obtain certain data from content server 322 via wireless link 316. In an exemplary embodiment of the present disclosure, for instance, navigation interface 600 may send a query to content server 322 via wireless link 316. In the query, navigation interface may pass an identifier to content server 322. For example, the identifier may be an IMSI number stored on SIM 290B; however, any identifier sufficient to identify the query as coming from a subscriber may be used.

Content server 322 may then determine whether the identifier corresponds to a subscriber to the application 405, and, if so, the subscriber's level of access (e.g., whether the subscriber has basic or premium access). If content server 322 determines that the identifier does not correspond to a subscriber, then content server 322 may deny access to the application content 400. Conversely, if content server 322 determines that the identifier does correspond to a subscriber of the application, then content server may reply by transmitting certain startup content to electronic device 100.

In order to allow navigation interface 600 to quickly present frequently used content to the user, for example, content server 322 may transmit data necessary for the display of a startup content page and/or other popular content in response to the initial query. Content server 322 may also transmit data related to the subscriber's frequently viewed content. In the exemplary Mobile ESPN™ application 405, for example, navigation content server 322 may transmit the latest version of a startup content page 2.1 ("News—Lead Stories") as well as other time sensitive content necessary for the display of frequently used content pages 415, such as lead headlines, sport-specific headlines, and scoreboards. Content server 322 may also transmit headlines related to the subscribers' favorite teams, and may further download data related to the subscriber's personalization settings, such as the identities of their favorite teams, players, and/or sports columnists. Alternatively, navigation interface may maintain a copy of such personalization data within system memory 290C of electronic device 100.

Upon receiving the startup content, navigation interface may save a copy of such content, e.g., in a RAM portion of system memory 290C. Navigation interface 600 may then may use the startup content to display a startup screen.

Figure 6A:
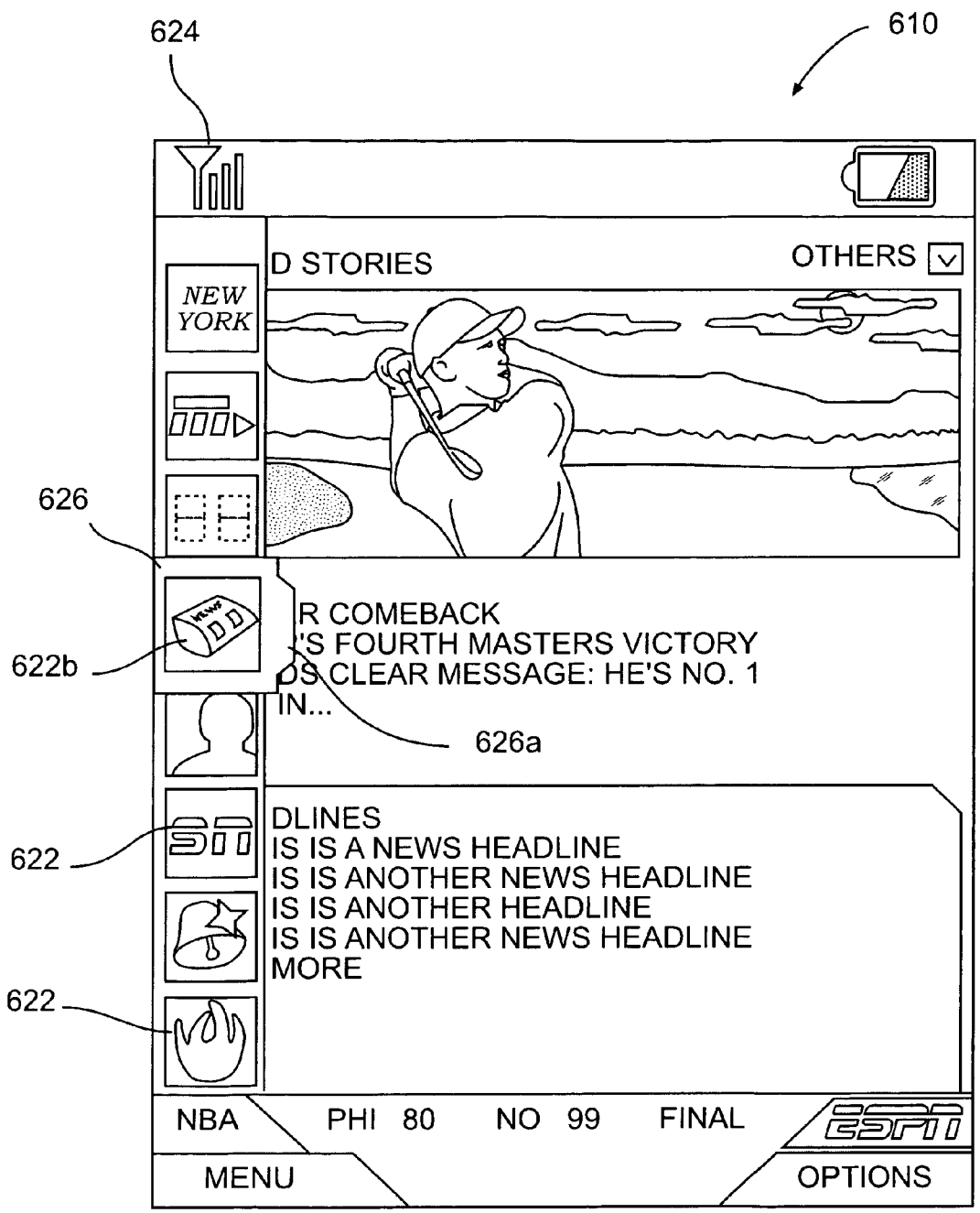
FIGS. 6A-E shows a plurality of screen displays of an exemplary navigation interface, consistent with the present disclosure.

FIG. 6A shows an exemplary startup screen 610 of application 405. As shown in FIG. 6A, the content portion 514 of startup screen 610 is populated with startup content page 2.1 ("News—Lead Stories"). In an exemplary embodiment of the present disclosure, startup screen 610 also displays a menu wheel 620 which may be used to navigate between frequently used content pages 415 and top menu 420 of application map 405.

Figure 6B:
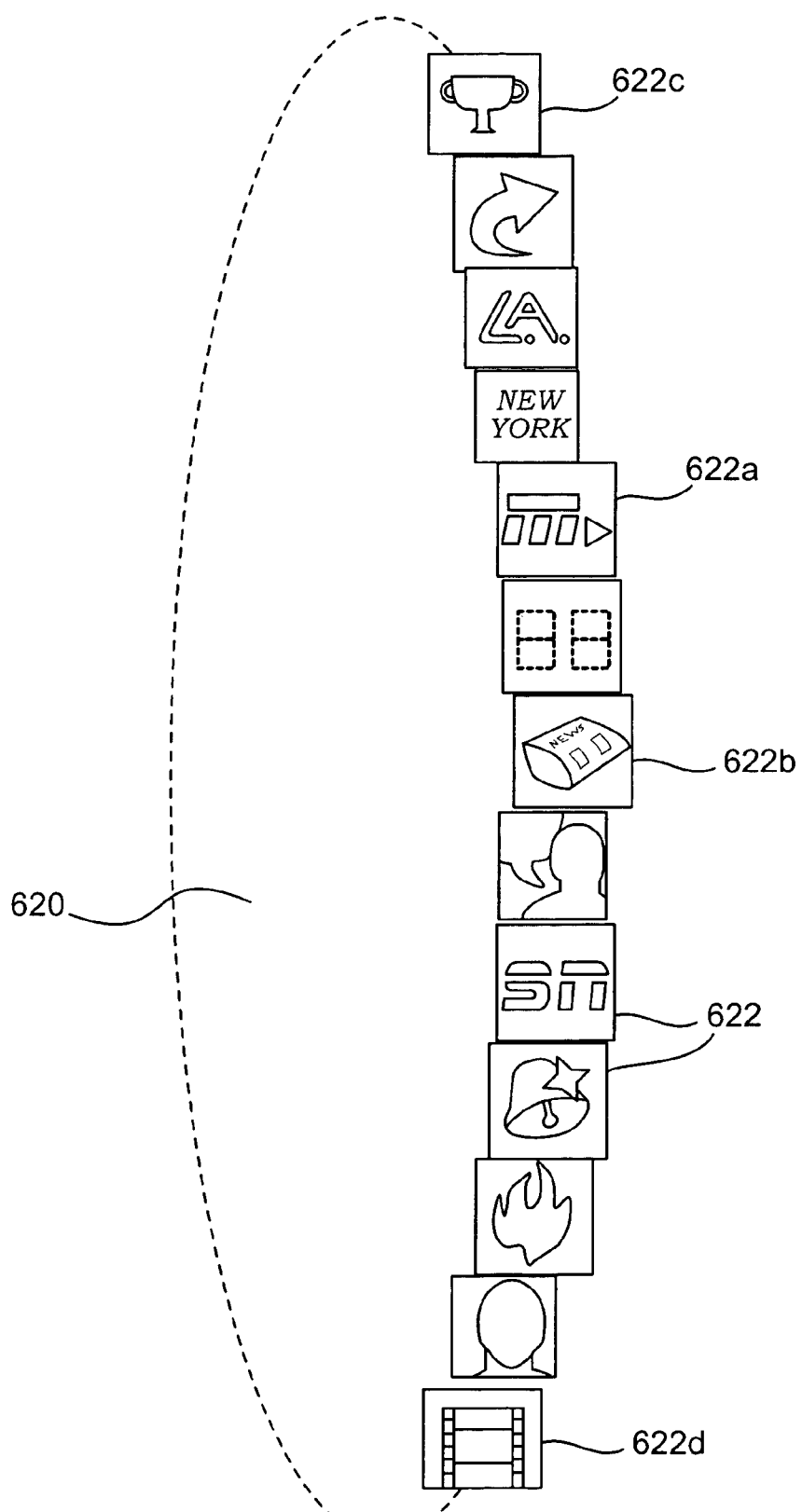

As shown in FIG. 6B, menu wheel 620 may include a plurality of panels 622. Each panel 622 of wheel 620 may contain a link to a frequently used function or content page 415 within application map 405. In particular, menu wheel 620 may include a panel 622a that provides a link to top menu 420. As shown in FIG. 6B, each panel 622 may display an icon and/or text that describes or symbolizes the function or content obtainable via selection of that link.

As shown in FIG. 6A, menu wheel 620 may be displayed in a single column 624 that appears to overlie content displayed in content portion 514 of exemplary screen display 610. In the exemplary navigation interface 600, menu wheel 620 overlies the far left side of content portion 514. However, it will be understood that menu wheel 620 may be positioned elsewhere within screen display, e.g., along another side of content portion 514, or at another arbitrary position within content portion 514, without departing from the scope of the present disclosure.

Menu wheel 620 may have any number of panels 622 (see FIG. 6B). However, as illustrated in FIG. 6A, navigation interface 600 may limit the number of panels 622 displayed at one time, depending on the size of content portion 514 and/or the resolution of display 130A, so as to maintain legibility of the displayed panels 622. Those panels 622 not displayed may be considered as having been rotated out of view.

Menu wheel 620 may be selectively activated (displayed) and deactivated (hidden) by the user, as discussed below. When menu wheel 620 is displayed, the content page 410 displayed within content portion 514 may be displayed with reduced (e.g., 50%) brightness. In the exemplary navigation interface 600, cursor focus may be placed on menu wheel 620 by default at any time that menu wheel 620 is activated from a deactivated state, such as upon startup. When cursor focus is on wheel 620, one panel 622 of the wheel 620 may be highlighted to indicate the position of the cursor. In the exemplary embodiment, panel 622b (corresponding to startup content page 2.1) may be highlighted by default upon startup.

The highlighted panel 622b may be indicated in any suitable manner. In the exemplary startup screen 610, the highlighted panel 622b is indicated by a highlight frame 626 that surrounds the panel. As illustrated in FIG. 6A, highlight frame 626 may be displayed in a relatively bright color (yellow in the exemplary embodiment) when cursor focus is on menu wheel 620. In addition, the highlighted panel 622b may be displayed with increased brightness with respect to the remaining panels 622. The brightness of the remaining panels 622 may also be gradually reduced towards the ends of the displayed portion of column 624 in order to give menu wheel 620 the appearance of a three dimensional wheel.

Figure 6C:
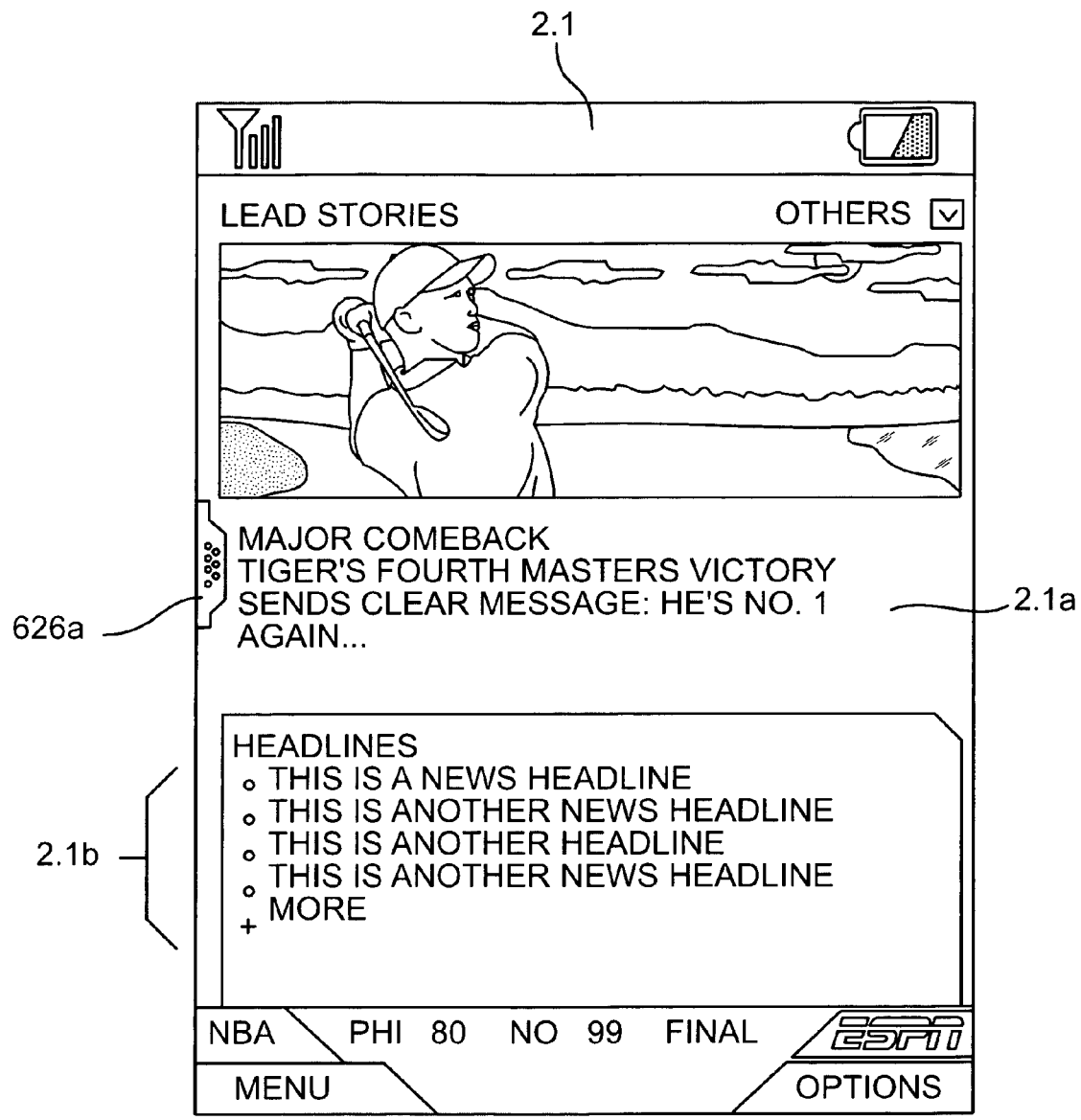

When menu wheel 620 is active (i.e., when the focus of the cursor is on the wheel), the user may deactivate, or hide, the wheel (e.g., in order to view the content page displayed in content portion 514) by entering an appropriate input. In the exemplary embodiment, for example, the user may deactivate the wheel by entering a RIGHT directional input, i.e., so as to move the cursor in the direction of content portion 514 from wheel 620. FIG. 6C shows the resulting screen display. Upon deactivation, the color of highlight frame 626 may be changed to a relatively dull color (maroon in the exemplary embodiment) and menu wheel 620 may be animated so as to appear to slide or otherwise retract off of the screen in the opposite direction, i.e., to the left in the exemplary embodiment. The brightness of content portion 514 may then revert to its normal level so that the user view the displayed content page 2.1. When menu wheel 620 is deactivated, a tab portion 626a of frame 626 may remain visible in the content portion 614 of the display, as a reminder of the availability of the menu wheel 620 function.

Figure 6D:
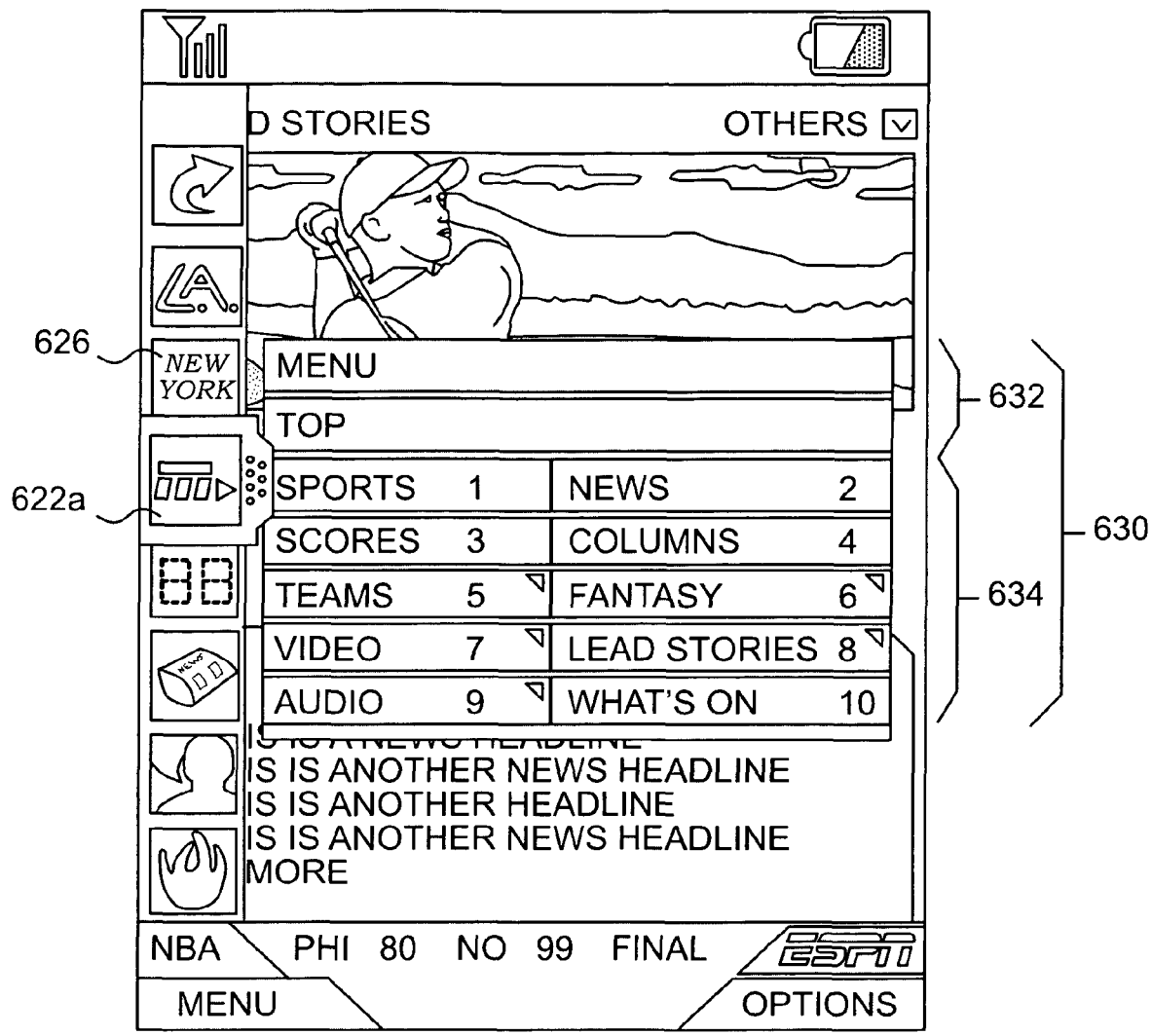

When menu wheel 620 is deactivated, the focus of the cursor may be placed on an uppermost link within content portion 514 (if any such links are present). The user may then navigate within content portion 514 using directional input 144. For example, upon deactivating the menu wheel to enter the exemplary startup page 2.1 of FIG. 6D, cursor focus may be placed on an uppermost left link 2.1a. The position of the cursor may be indicated in any suitable manner (e.g., by block-highlighting the text within link 2.1a, as shown in FIG. 6D). The user may open this link by entering a SELECT input. Alternatively, the user may enter an UP directional input in order to navigate to drop down menu 412, or enter a series of DOWN directional inputs in order to navigate among the remaining text links 2.1b, down to a link labeled "+ more," which may provide a link, e.g., to exemplary content page 2.2 ("News—Page 2").

If menu wheel 620 has been deactivated, the user may return it to the active mode by entering an appropriate input. In the exemplary embodiment, for example, the user may reactivate the wheel by entering a LEFT directional input from a leftmost position within content portion 514, i.e., opposite from the deactivation input, so as to move the cursor in the direction of tab 626a from content portion 514. Navigation interface 600 may monitor the movement of the cursor within the content portion and activate menu wheel 620 if the directional input would move the cursor outside of the boundary of the content portion.

Upon activation, the brightness of content portion 514 may again be reduced, and the color of the tab portion 626a of highlight frame 626 may revert to the relatively bright color (yellow in the above example). Wheel 620 may then be animated so as to appear to slide onto the screen from the left, and the focus of the cursor placed on the wheel (highlighted by frame 626). The screen display will again appear as shown in FIG. 6A. When menu wheel 620 is activated as described above (using the directional input), default panel 622*b* may be highlighted, regardless of which panel 622 was highlighted when menu wheel 620 was deactivated.

When cursor focus is on menu wheel 620, the user may also navigate around the panels 622 of wheel 620 by entering an appropriate input, e.g., by pressing the directional keys in the desired direction of rotation of the wheel (UP or DOWN in the exemplary embodiment). The position of frame 626 within content portion 514 remains static; panels 622 are animated so as to appear to rotate in the direction selected by the user. Panels 622 wrap around wheel 620 (as indicated by a dashed line in FIG. 6B), so that the topmost panel 622*c* in FIG. 6B is displayed following the bottommost panel 622*d*, and vice-versa. As a result, panels 622 are repetitively navigable using a directional input directed in a single direction. When the panel providing the desired link appears in frame 626, the user may open the link by entering an appropriate input (a SELECT input in the exemplary embodiment). The result of this selection may depend upon whether the selected panel corresponds to a content page 410 or to a menu, e.g., top menu 420.

If the selected panel 622 corresponds to a content page, then menu wheel 620 may be deactivated as described with respect to FIG. 6C above. Navigation interface 600 may then search for the requested content page in system memory 290C. If the requested content page is not found within system memory 290C, then navigation interface may request the page from content server 322, as described above. Upon retrieving the requested page from either system memory 290C or content server 322, navigation interface may display the page in content portion 514, with the focus of the cursor placed on an uppermost link (if any) of the content page. The resulting screen may then appear as in FIG. 6C.

If the selected panel 622 corresponds to a menu, then a menu box may upon selection of the link. In FIG. 6D, for example, the user has rotated menu wheel 620 as described above to highlight the top menu panel 622*a*, and pressed the SELECT input 146, thus opening a menu box 630. Menu box 630 may include a trail portion 632 and a links portion 634. Trail portion 632 may be used to provide a "breadcrumb trail" indicating the location of the current menu within menu hierarchy. Links portion 634 may contain one or more link buttons 1-10 that link to either a submenu or content page 410. As shown in FIG. 6D, for example, links portion 634 may include two columns of link buttons 1-10. The link buttons 1-10 may be organized by the application developer according to frequency of use, with link button 1 corresponding to the most frequently used link ("SPORTS" in the exemplary menu of FIG. 6E).

Menu box 630 may open so as to overlie content portion 514 to the right of frame 626. When menu box 616 is opened, the color of highlight frame 626 may be changed to a relatively dull color (maroon in the exemplary embodiment) and cursor focus may be placed on the link closest to frame 626, i.e., the top left link (link button 1, "SPORTS") in the exemplary screen display of FIG. 6E. The position of the cursor may be indicated in any suitable manner, e.g., by changing the color of the border of the link button to a relatively bright color, as shown in FIG. 6D.

If the user wishes to return to the menu wheel 620, e.g., in order to select a different panel 622, the user may place cursor focus back on wheel 620 in order to navigate to the desired panel. In the exemplary embodiment, this may be accomplished by moving the cursor in the direction of wheel 620 from any of the links on the menu wheel 620 side of menu box 630, e.g., by entering a LEFT directional input when cursor focus is on any of the links on the left side of menu box 630 (link buttons 1, 3, 5, 7, and 9). Alternatively, the user may return cursor focus to wheel 620 by entering a BACK navigation input. Menu box 630 will then close and the user may then navigate around wheel 620 as described above. As another alternative, the user may navigate the cursor highlight among links 1-10 using directional input 144, or by entering the number corresponding to the desired link button (1-10) on alphanumeric keypad 140A. When the link button providing the desired link is highlighted, the user may open that link by entering a SELECT input.

Figure 6E:
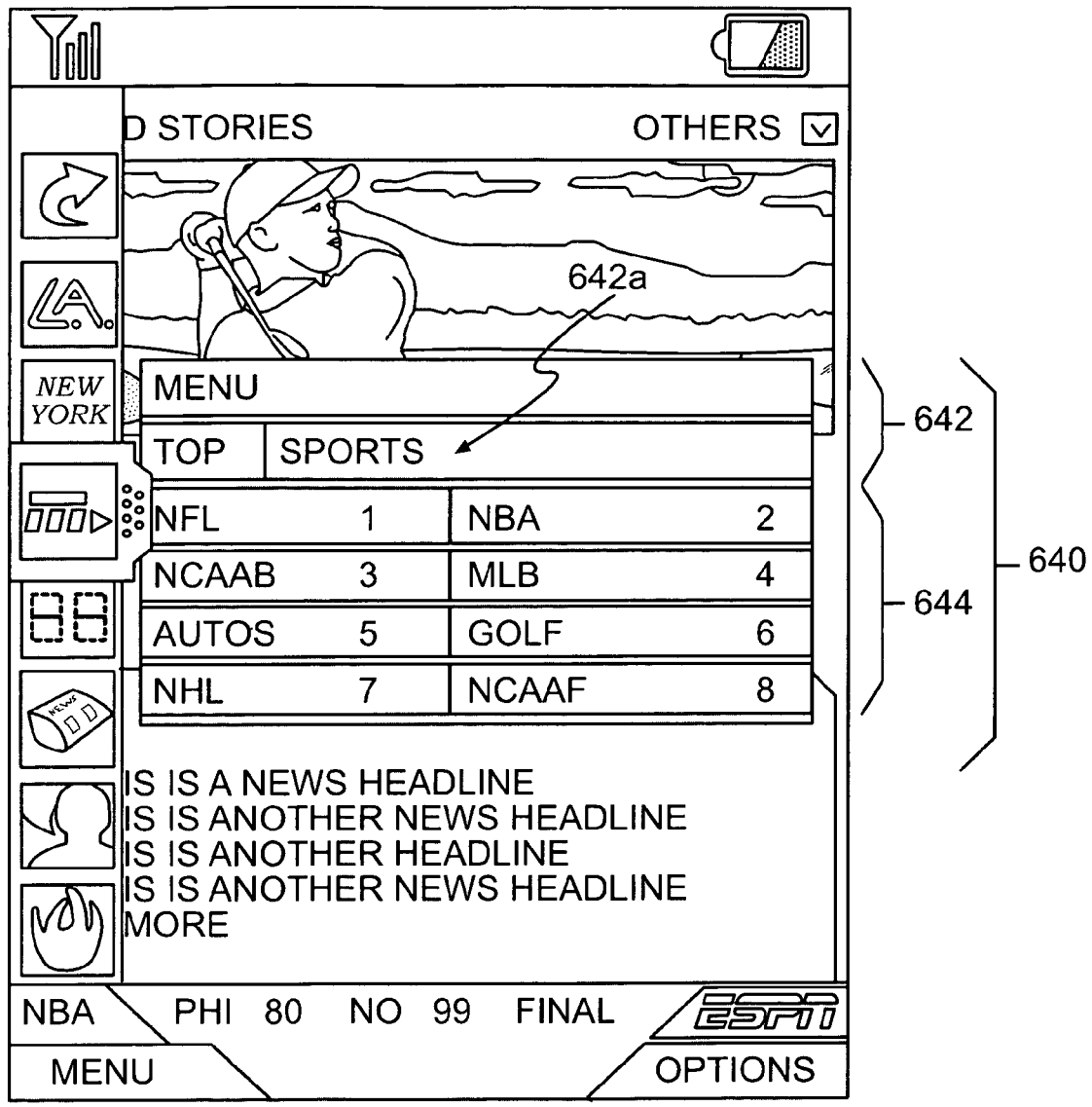

If the selected panel 622 corresponds to a content page, then navigation interface 600 may deactivate menu wheel 620 and display the requested content page as described above. If the selected link button corresponds to a submenu, then a submenu box may open. FIG. 6E, for example, shows a submenu box 640 that may be displayed upon selection of the SPORTS submenu within top menu 420. As shown in FIG. 6E, submenu box 640 may open to the right of frame 626 (replacing menu box 630). Submenu box 640 may include a trail portion 642 and a links portion 644, similar to the corresponding portions of menu box 630.

Trail portion 642 may of submenu 640 may include a link 642*a* to the previous menu ("TOP"). When submenu box 640 opens, cursor focus may be placed on the top left link, as described above with respect to menu box 630. The user may navigate links portion 644 of submenu box 640 in the same manner as links portion 634 of menu box 630. The user may also navigate to trail portion 642 by pressing the UP directional key from any of the topmost links in links portion 644 (link buttons 1 or 2 in FIG. 6E). Cursor focus will then be placed on the rightmost (lowest level) menu listed in trail portion (SPORTS in FIG. 6E). The position of the cursor may be indicated, e.g., by changing the color of the text. The user may then navigate to the previous menu (TOP), by highlighting the desired link with the cursor and pressing SELECT. The menu box corresponding to the selected menu would then open as above.

Navigation interface 600 may also provide a "Menu" input for enabling the user to obtain quick access to top menu function 420. In the exemplary embodiment, for example, this function may be assigned to the LEFT SOFTKEY (as denoted in the softkey label portion 518 of FIGS. 5, 6A, 6C and 6E). The function performed by the menu input may vary based upon the state of content portion 514.

If content portion is displaying the TOP menu, then the menu input may be disabled. As shown in FIG. 6D, for example, the LEFT SOFTKEY has no function when TOP menu 420 is displayed. If content portion is displaying a submenu, then entry of the "Menu" input may open the TOP menu, as shown in FIG. 6D.

If content portion is displaying a content page, then, upon selection of the "Menu" input, navigation interface 600 may open a menu or submenu that is contextually relevant to the particular content page 410 being displayed. For example, navigation interface 600 may maintain a database, e.g., in system memory 290C, pairing a menu or submenu with some or all of the content pages in application 405. Alternatively, the database may be maintained by content server 322, and navigation interface may obtain the identity of the related menu or submenu via an appropriate query to content server 322.

Upon retrieving the identity of the corresponding menu or submenu, navigation interface may activate menu wheel 620 as described above with respect to FIG. 6A. However, rather than highlighting default menu panel 622*b*, as when activated using the directional input, wheel 620 may instead animate so as to rotate until top menu panel 622*a* is highlighted. Navigation interface 600 may then open the appropriate menu box 630 or submenu box 640 as described above with respect to FIGS. 6D and E. In the case where a submenu box 640 is to be displayed, navigation interface 600 may open the submenu box directly, i.e., without displaying any intervening menu boxes 630 or submenu boxes 640.

As described above, systems and methods consistent with the present disclosure provide for intuitive navigation across broad content, without regard to the size of the display screen or the type of user input devices present on the device. Further, navigation interfaces consistent with the present disclosure allow users to activate, deactivate and navigate a complex menu structure solely using a directional input. Other embodiments of the present disclosure will be apparent to those skilled in the art from consideration of the specification and practice of the concepts disclosed herein. It is intended that the specification and examples be considered as exemplary only, with a true scope and spirit of the invention being indicated by the following claims.

What is claimed is:

1. A nontransitory computer readable storage medium containing instructions for configuring a processor to perform a method for providing a graphical user interface on a display, the method comprising:
    providing a menu, the menu comprising a plurality of links, wherein the links include a plurality of links that correspond to submenus, each of the submenus comprising a further plurality of links;
    monitoring a plurality of user inputs;
    monitoring the position of a cursor within the display;
    displaying the menu upon entry of a first user input;
    displaying the submenu upon selection of the corresponding submenu link within the menu;
    monitoring content in a content portion of display;
    determining whether the cursor is within the content portion of the display and whether the menu is displayed; and
    when it is determined that the cursor is within the content portion of the display and the menu is not displayed, and upon entry of a second user input, determining which of the submenus to display based on the content of the content portion and displaying the determined submenu, without first displaying the menu.

2. The nontransitory computer readable storage medium of claim 1, wherein monitoring a plurality of user inputs includes monitoring a directional user input that controls movement of the cursor.

3. The nontransitory computer readable storage medium of claim 2, wherein the plurality of link in the menu are repetitively navigable using a directional input directed in a single direction.

4. The nontransitory computer readable storage medium of claim 2, wherein:
    the content portion has a boundary; and
    the cursor is movable between at least two positions within the boundary of the content portion; and
    the first user input consists of a directional input in a direction that would move the cursor beyond the boundary of the content portion.

5. The nontransitory computer readable storage medium of claim 4, wherein the first user input consists of a directional input that would move the cursor beyond the boundary of the content portion in one direction.

6. The nontransitory computer readable storage medium of claim 5, further comprising
    removing the menu from the display upon entry of a directional input in the opposite direction.

7. The nontransitory computer readable storage medium of claim 1, wherein:
    determining which of the submenus to display based on the content of the content portion comprises retrieving an identifier for the content of the content portion; and
    determining which of the submenus to display comprises determining which of the submenus to display based on the identifier.

8. The nontransitory computer readable storage medium of claim 7, wherein the identifier is a filename of a content page displayed in the content portion.

9. The nontransitory computer readable storage medium of claim 1, wherein the content portion of the display displays a content page and at least one of the menu and the submenu contains a link to the content page.

10. The nontransitory computer readable storage medium of claim 1, wherein the second user input consists of a single keystroke.

11. A system for providing a graphical user interface, the system comprising:
    a processor; and
    a computer readable medium containing instructions for configuring the processor to:
        provide a menu, the menu comprising a plurality of links, wherein the links include a plurality of links that correspond to submenus, each of the submenus comprising a further plurality of links;
        monitor a plurality of user inputs;
        monitor the position of a cursor within the display;
        display the menu upon entry of a first user input;
        display the submenu upon selection of the corresponding submenu link within the menu;
        monitor content in a content portion of the display;
        determining whether the cursor is within the content portion of the display and whether the menu is displayed; and
        when it is determined that the cursor is within the content portion of the display and the menu is not displayed, and upon entry of a second user input, determining which of the submenus to display based on the content of the content portion and displaying the determined submenu, without first displaying the menu.

12. The system of claim 11, wherein monitoring a plurality of user inputs includes monitoring a directional user input that controls movement of the cursor.

13. The system of claim 12, wherein the plurality of links in the menu are repetitively navigable using a directional input directed in a single direction.

14. The system of claim 12, wherein:
    the content portion has a boundary; and
    the cursor is movable between at least two positions within the boundary of the content portion; and
    the first user input consists of a directional input in a direction that would move the cursor beyond the boundary of the content portion.

15. The system of claim 14, wherein the first user input consists of a directional input that would move the cursor beyond the boundary of the content portion in one direction.

16. The system of claim 15, further comprising removing the menu from the display upon entry of a directional input in the opposite direction.

17. The system of claim 11, wherein:
   determining which of the submenus to display based on the content of the content portion comprised retrieving an identifier for the content of the content portion; and
   determining which of the submenus to display comprises determining which of the submenus to display based on the identifier.

18. The system of claim 17, wherein the identifier is a filename of a content page displayed in the content portion.

19. The system of claim 11, wherein the content portion of the display displays a content page and at least one of the menu and submenu contains a link to the content page.

20. The system of claim 11, wherein the second user input consists of a single keystroke.

21. An electronic device comprising:
   a display;
   a processor configured to control the display of a graphical user interface on the display; and
   a computer readable medium containing instructions for configuring the processor to:
      provide a menu, the menu comprising a plurality of links, wherein the links include a plurality of links that correspond to submenus, each of the submenus comprising a further plurality of links;
      monitor a plurality of user inputs;
      monitor the position of a cursor within the display;
      display the menu upon entry of a first user input;
      display the submenu upon selection of the corresponding submenu link within the menu;
      monitor content in a content portion of the display;
      determining whether the cursor is within the content portion of the display and whether the menu is displayed; and
      when it is determined that the cursor is within the content portion of the display and the menu is not displayed, and upon entry of a second user input, determining which of the submenus to display based on the content of the content portion and displaying the determined submenu, without first displaying the menu.

22. The device of claim 21, wherein monitoring a plurality of user inputs includes monitoring a directional user input that controls movement of the cursor.

23. The device of claim 22, wherein the plurality of links in the menu are repetitively navigable using a directional input directed in a single direction.

24. The device of claim 22, wherein:
   the content portion has a boundary; and
   the cursor is movable between at least two positions within the boundary of the content portion; and
   the first user input consists of a directional input in a direction that would move the cursor beyond the boundary of the content portion.

25. The device of claim 24, wherein the first user input consists of a directional input that would move the cursor beyond the boundary of the content portion in one direction.

26. The device of claim 25, the computer readable medium further containing instructions for configuring the processor to remove the menu from the display upon entry of a directional input in the opposite direction.

27. The device of claim 21, wherein:
   determining which of the submenus to display based on the content of the content portion comprises retrieving an identifier for the content of the content portion; and
   determining which of the submenus to display comprises determining which of the submenus to display based on the identifier.

28. The device of claim 27, wherein the identifier is a filename of a content page displayed in the content portion.

29. The devise of claim 21, wherein the content portion of the display displays a content page and at least one of the menu and the submenu contains a link to the content page.

30. The devise of claim 21, wherein the second user input consists of a single keystroke.

31. The device of claim 21, wherein the device comprises one of: (a) a cellular telephone, (b) a PDA, or (c) a pager.

32. A method for providing a graphical user interface on an electronic display, the method comprising:
   providing a menu, the menu comprising a plurality of links, wherein the links include a plurality of links that correspond to submenus, each of the submenus comprising a further plurality of links;
   monitoring a plurality of user inputs;
   monitoring the position of a cursor within the display;
   displaying the menu upon entry of a first user input;
   displaying the submenu upon selection of the corresponding submenu link within the menu;
   monitoring content in a content portion of the display;
   determining whether the cursor is within the content portion of the display and whether the menu is displayed; and
   when it is determined that the cursor is within the content portion of the display and the menu is not displayed, and upon entry of a second user input, determining which of the submenus to display based on the content of the content portion and displaying the determined submenu, without first displaying the menu.

33. The method of claim 32, wherein monitoring a plurality of user inputs includes monitoring a directional user input that controls movement of the cursor.

34. The method of claim 33, wherein the plurality of links in the menu are repetitively navigable using a directional input directed in a single direction.

35. The method of claim 33, wherein:
   the content portion has a boundary; and
   the cursor is movable between at least two positions within the boundary of the content portion; and
   the first user input consists of a directional input in a direction that would move the cursor beyond the boundary of the content portion.

36. The method of claim 35, wherein the first user input consists of a directional input that would move the cursor beyond the boundary of the content portion in one direction.

37. The method of a claim 36, further comprising removing the menu from the display upon entry of a directional input in the opposite direction.

38. The method of claim 32, wherein:
   determining which of the submenus to display based on the content of the content portion comprises retrieving an identifier for the content of the content portion; and
   determining which of the submenus to display comprises determining which of the submenus to display based on the identifier.

39. The method of claim 38, wherein the identifier is a filename of a content page displayed in the content portion.

40. The method of claim 32, wherein the content portion of the display displays a content page and at least one of the menu and the submenu contains a link to the content page.

41. The method of claim 32, wherein the second user input consists of a single keystroke.

* * * * *